United States Patent Office 3,125,583
Patented Mar. 17, 1964

3,125,583
α-PHENYL-γ-AMINO BUTYRIC ACIDS AND DERIVATIVES THEREOF
Frederick Leonard, Yonkers, N.Y., assignor to Geigy Chemical Corporation, Ardsley, N.Y., a corporation of Delaware
No Drawing. Filed Jan. 29, 1960, Ser. No. 5,365
10 Claims. (Cl. 260—340.5)

The present invention relates to new and pharmacologically valuable α-phenyl γ-amino butyric acids, derivatives thereof and non-toxic salts thereof. This application is a continuation-in-part of applicant's copending application Serial No. 680,673, filed August 28, 1957 (abandoned since the filing of the present application).

A primary object of the invention is the embodiment of a new class of compounds especially useful to alter the degree of nervous system impulse transmission, said transmission being an important factor in the manifestations of central nervous system and neuromuscular abnormalities. It is a desideratum that the said compounds have a selective action in relation to the neuromuscular junction and nervous system synapses so as to act rapidly and reversibly on the animal organism and that, concomitantly, the toxicity be as low as possible.

A further object of the invention is the provision of a method of inducing neuromuscular paralysis in the living organism.

The aforesaid objects are realized by the present invention which embodies a class of compounds corresponding to the formula

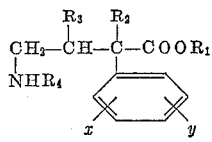

(I)

wherein $R_1$ represents hydrogen, lower alkyl, preferably ethyl, alkali metal ion, e.g., Na, K, etc. and monovalent equivalent of alkaline earth metal ion, e.g., ½ Ca, ½ Mg. etc.;
$R_2$ represents hydrogen and carbo-lower alkoxy, preferably carbethoxy;
$R_3$ and $R_4$ each independently represent hydrogen and lower alkyl, preferably methyl;
$x$ represents lower alkyl, preferably methyl, lower alkoxy, preferably methoxy, halogen, preferably chlorine, and hydrogen;
$y$ represents lower alkyl, preferably methyl, and hydrogen;
$x$ and $y$ taken together represent the methylene dioxide substituent attached to adjacent carbon atoms of the phenyl group;

as well as the non-toxic, pharmaceutically acceptable addition salts thereof with acids and bases.

In a further embodiment, the invention relates to a method of inducing neuromuscular paralysis in the living organism which comprises administering thereto an effective quantity of a compound of the formula

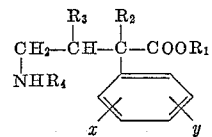

(I)

wherein the $R_1$, $R_2$, $R_3$, $x$ and $y$ groups have the precedingly defined significances.

The new compounds of the Formula I may be prepared in a number of ways.

Thus the said compounds may be obtained by hydrogenation of phenyl acetic acid esters of the formula:

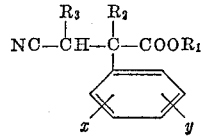

(II)

wherein $R_2$, $R_3$, $x$ and $y$ have the precedingly defined significances, $R_1$ is lower alkyl, e.g., ethyl, followed if desired by monoalkylation, preferably reductive alkylation by condensation with a lower oxo alkane and simultaneous or subsequent reduction.

The said compounds may e.g. be obtained by hydrogenation of a suitably substituted or unsubstituted ethyl phenylcyanopropionate to produce the corresponding α-phenyl- or α-substituted phenyl butyric acid and esters thereof. Reduction of these α-phenylbutyric acids and related compounds yields the corresponding N-alkylated derivatives.

Alternatively, Compound I may be obtained by reduction of an oxime of the formula:

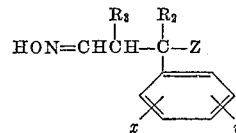

(III)

wherein $R_2$, $R_3$, $x$ and $y$ have the precedingly defined significances and Z represents a cyano group (—CN) or a group —COOR$_1$ (if necessary) followed by hydrolysis of the cyano group, if present, to the carboxyl group ($R_1$ having the precedingly indicated significance).

Still another method for making Compound I comprises alkylation of dialkylphenylmalonates with ω-chloroalkanonitriles followed by reduction (alkylation) and hydrolysis. For example diethylphenylmalonate may be employed as follows:

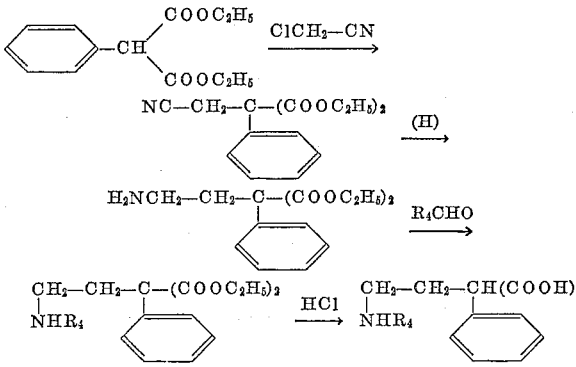

($R_4$ has the precedingly defined significance.)

A further method of preparing compound I may be utilized whereby α-acyl phenyl acetic acid esters of the formula:

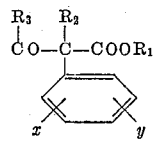

(IV)

may be converted by treatment with nitromethane into nitro compounds of the formula:

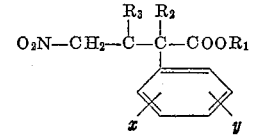

(V)

and these latter (V) can be hydrogenated, and, if desired, reductively alkylated to compounds of the Formula I. ($R_1$, $R_2$, $R_3$ $x$ and $y$ all have the meanings given previously.)

Compounds of the Formula I may also be prepared from appropriately substituted phenyl glutaramic acids of the formula:

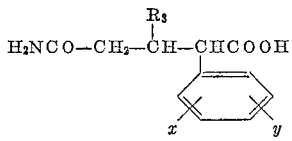

wherein $R_3$ has the meaning defined above, or from the corresponding imides by treatment with an alkali hypohalite such as e.g. potassium hypobromite and, if desired, reductive alkylation of the α- or γ-amino acids obtained.

Finally, a phenyl acetic acid derivative of the formula:

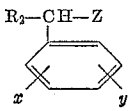

wherein $R_2$, $x$, $y$ and $Z$ have the meanings given above, can be reacted with an acylamino-alkyl halide of the formula:

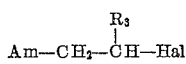

wherein Hal represents chlorine or bromine, Am represents an imide group, an amido group or an N-lower alkylamido group and $R_3$ has the meaning given above, in the presence of an alkaline condensing agent, and the condensation product of the formula

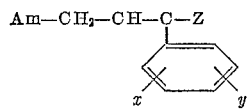

can be hydrolyzed with regard to its acylated amino group Am and the cyano groups or ester group $Z$ and a possible ester group $R_2$ to form a compound of the Formula I.

The new compounds I of the present invention are neuromuscular blocking agents which are useful as muscle relaxants, e.g., during surgical procedures. They are administered perorally or parenterally in the form of their non-toxic acid addition salts with pharmaceutically acceptable acids. They are also administered as salts with pharmaceutically acceptable bases.

The new compounds I are also useful in the treatment of mental depressions resulting from nervous exhaustion, chronic fatigue and drug therapy. Said compounds are fast acting and low in toxicity.

The following examples set forth presently preferred representative embodiments of the invention. In these examples, the parts are by weight, unless otherwise indicated; and the relationship between parts by weight and parts by volume is as that between grams and milliliters. Temperatures are in degrees centigrade; percentages are by weight. Although where salts are involved, the examples, illustrate hydrochlorides, it will be understood that this is solely because these are the presently preferred salts. The new bases form a wide variety of salts with inorganic as well as organic acids; thus, they form e.g. the hydrobromides, phosphates, acetates, benzoates, tartrates, citrates, methanesulfonates, etc.

*Example 1*

4.6 parts (0.2 mol) of sodium are dissolved in 100 parts by volume of absolute ethyl alcohol. To the resulting solution of sodium ethylate is added stepwise 53 parts (10% excess) of diethylphenylmalonate and 16 parts (0.2 mol) of chloracetonitrile while maintaining a reaction temperature of 30–35° C. The mixture is stirred and heated at 55–60° C. for two hours, let stand at room temperature for two hours, poured into 200 parts by volume of ice water and neutralized with acetic acid. The ester is extracted from the mixture with ether, and the extract dried over anhydrous sodium sulfate. Fractionation at 1 mm. Hg pressure gives 35 parts of ethyl 2-carbethoxy-3-cyano-2-phenyl-propionate; B.P. 136–138°. 14 parts of the latter are dissolved in a mixture of 100 parts by volume of ethyl alcohol and 4.5 parts by volume of concentrated aqueous hydrochloric acid and hydrogenated at 3 atmospheres initial pressure in the presence of 0.05 part of 5% palladium-on-charcoal. Hydrogenation is complete in twelve hours. The reaction mixture is filtered, concentrated in vacuo, and the residual syrup crystallized from a 3:1 mixture of petroleum ether and benzene. Recrystallization from a 1:1 mixture of the same solvents gives ethyl 4-amino-2-carbethoxy-2-phenylbutyrate hydrochloride. M.P. 111–113° C. Yield: 8 parts.

*Example 2*

A mixture of 16 parts (0.05 mol) of ethyl 4-amino-2-carbethoxy-2-phenylbutyrate hydrochloride, 20 parts by volume of methanol, and 40 parts by volume of concentrated hydrochloric acid is refluxed for six hours and concentrated in vacuo. The white crystalline residue is recrystallized from ethanol, M.P. 193–195°. Yield: 14 parts of 4-amino-2-phenylbutyric acid hydrochloride.

*Example 3*

12 parts of ethyl 4-amino-2-carbethoxy-2-phenylbutyrate hydrochloride are dissolved in 100 parts by volume of alcohol. To the solution are added 5 parts of 37% formaldehyde, and 0.050 part of 5% palladium-on-charcoal. Hydrogenation is carried out in eighteen hours. The mixture is filtered and concentrated in vacuo. The crystalline residue is refluxed for eight hours in a mixture of 10 parts by volume of methanol and 30 parts by volume of 6-normal hydrochloric acid, and then concentrated in vacuo. The residual syrup crystallizes upon addition of petroleum ether. Recrystallization from ethanol gives 4-methylamino-2-phenylbutyric acid hydrochloride. M.P. 140–142°. Yield: 1.5 parts.

*Example 4*

4 parts of 4-amino-2-phenylbutyric acid hydrochloride are dissolved in 50 parts by volume of absolute ethyl alcohol. The resulting solution of 4-amino-2-phenylbutyric acid is then saturated with gaseous hydrogen chloride at 0° C. and set aside at room temperature for 6 days. The reaction mixture is concentrated in vacuo. The resulting oil crystallized from a solution of ethyl acetate and ether. It melted without change at 128–130° after two recrystallizations from ethyl acetate-ethanol mixtures. Yield: 1 part of ethyl 4-amino-2-phenylbutyrate hydrochloride.

*Example 5*

77 parts of diethyl phenylmalonate are added in one portion to a solution of sodium ethoxide prepared from 7 parts of sodium and 175 parts by volume of absolute ethyl alcohol. To this mixture is added 27 parts of α-chloropropionitrile at a temperature of 60–65° C. The reaction mixture is stirred for 3 hours at 60–65° C. and at room temperature overnight. The mixture is poured into water and made neutral with acetic acid. The oily layer is extracted with ether, and dried. Removal of the ether and distillation gives ethyl 2-carbethoxy-3-cyano-2-phenylbutyrate. B.P. 147–150°. Yield 17 parts. This nitrile is reduced in the same manner as the homologous propionate to yield ethyl 4-amino-2-carbethoxy-2-phenylisovalerate hydrochloride. M.P. 123–124°. Yield: 6 parts after recrystallization from benzene.

*Example 6*

5 parts of ethyl 4-amino-2-carbethoxy-2-phenylisovalerate hydrochloride are hydrolyzed and worked up in the same manner as described in Example 2. The crude syrupy reaction product is made crystalline by trituration with benzene and recrystallized from a 9:1 benzene isopropyl alcohol mixture. Yield: 1 part of 4-amino-2-phenyl-isovalerate hydrochloride; M.P. 175–176°.

*Example 7*

6.9 parts of sodium are dissolved in 150 parts by volume of absolute ethanol. The resulting solution is concentrated in vacuo to dryness. To the solid residue is added in one portion 60 g. of ethyl p-methoxyphenylacetate dissolved in 250 ml. of diethyl carbonate. The mixture is stirred and heated to distillation. Distillation is continued until the boiling point of the distillate reaches 125°. The mixture is cooled, ice water added and neutralized with acetic acid, crude diethyl p-methoxyphenylmalonate is extracted with ether, the extract is washed with water and dried. Distillation yields 44 parts of diethyl p-methoxyphenylmalonate, B.P. 148–150°/1 mm.

3 parts of sodium is dissolved in 100 parts by volume of absolute alcohol. 32 parts of diethyl p-methoxyphenylmalonate dissolved in 75 parts by volume of diethyl carbonate is added to the alcoholic-ethoxide solution. The mixture is stirred at 60° for 15 minutes, treated with 10 parts of chloroacetonitrile at 60°, is refluxed with stirring for 3 hours and is then let stand overnight. Water is added, the mixture made neutral with acetic acid and extracted with ether. The extract is dried over anhydrous sodium sulfate and distilled. Diethyl 2-cyanomethyl-2-(p-methoxyphenyl) malonate distills at 160–165°/1 mm. Yield: 15 parts.

Diethyl 2-cyanomethyl-2-(p-methoxyphenyl) malonate (7.25 parts) is dissolved in a mixture of 100 parts by volume of alcohol and 2.25 parts by volume of concentrated hydrochloric acid. 0.05 part of platinum oxide is added and the mixture is hydrogenated. Absorption of hydrogen stops in 3 hours, the catalyst is removed by filtration and the filtrate is concentrated in vacuo. The syrupy residue is triturated with ether at ice-bath temperature to cause crystallization. Recrystallization of the crude product from benzene gave 6.5 parts of ethyl 4-amino-2-carbethoxy-2-(p-methoxyphenyl) butyrate hydrochloride, M.P. 98–100°.

*Example 8*

6.5 parts of ethyl 4-amino-2-carbethoxy-2-(p-methoxyphenyl) butyrate hydrochloride are hydrolyzed by the procedure described in Example 2. There is thus obtained 1 part of 4-amino-2-(p-methoxyphenyl) butyric acid hydrochloride, M.P. 188–189° after recrystallization from an acetone-ethanol mixture.

*Example 9*

8 parts of 4-amino-2-(p-methoxyphenyl)-butyric acid hydrochloride are esterified by the procedure described in Example 4. The crude ethyl 4-amino-2-(p-methoxyphenyl)-butyrate hydrochloride melts at 90–100° and is recrystallized from a mixture of ethylacetate and n-hexane. Yield after recrystallization, 7.7 parts; M.P. 92–94°.

*Example 10*

12 parts of 3,4-xylylacetonitrile are added to a mixture of 60 parts by volume of concentrated sulfuric acid and 1300 parts by volume of commercial 2B alcohol. The mixture is stirred and refluxed for 6 hours, cooled and diluted with water. The oily layer is extracted with ether, the extract washed with water and dried over anhydrous sodium sulfate. The drying agent is removed and the filtrate fractionated. Ethyl 3,4-xylylacetate distills at 105–107°/2 mm. Yield: 70 parts.

58 parts of ethyl 3,4-xylylacetate are carbethoxylated by the method described in Example 7. Distillation gives 44 parts of diethyl 3,4-xylylmalonate, B.P. 150–153°/2 mm.

44 parts of diethyl 3,4-xylylmalonate are alkylated with chloroacetonitrile by the method described in Example 7. There are obtained on work-up of the reaction mixture 20 parts of diethyl 2-cyanomethyl-2-(3,4-xylyl)-malonate, B.P. 185°/1 mm.

7 parts of diethyl 2-cyanomethyl-2-(3,4-xylyl)-malonate are hydrogenated by the method described in Example 9. The crude syrup is crystallized by trituration at ice-bath temperature with petroleum ether and recrystallized from a mixture of petroleum ether and ethyl acetate. Yield of ethyl-4-amino-2-carbethoxy-2-(3,4-xylyl)-butyrate hydrochloride, 5 parts; M.P. 103–105°.

*Example 11*

3 parts of ethyl-4-amino-2-carbethoxy-2-(3,4-xylyl)-butyrate hydrochloride are hydrolyzed by the method described in Example 2. The crystalline residue obtained upon evaporation of the reaction mixture in vacuo is recrystallized from an alcohol-ether mixture and yields 1.5 parts of 4-amino-2-(3,4-xylyl) butyric acid hydrochloride, M.P. 216–219.

*Example 12*

4-amino-2-(3,4-xylyl)-butyric acid hydrochloride (2 parts) are esterified by the method used to prepare ethyl 4-amino-2-phenylbutyrate hydrochloride (see Example 4). Ethyl 4-amino-2-(3,4-xylyl) butyrate hydrochloride so obtained melts at 102–103 after recrystallization from ethyl acetate petroleum ether mixture. Yield, 1 part.

*Example 13*

Ethyl p-chlorophenylacetate is converted to diethyl p-chlorophenylmalonate by the method described in Example 7 for the preparation of diethyl p-methoxyphenylmalonate. It distills at 140–142° at 3 mm. pressure.

Alkylation of diethyl p-methoxyphenylmalonate by the process described in Example 7 gives diethyl 2-(p-chlorophenyl)-2-cyanomethylmalonate, B.P. 155–160°/0.4 mm.

31 parts of diethyl 2-(p-chlorophenyl)-2-cyanomethylmalonate are hydrogenated in the presence of an equivalent quantity of hydrochloric acid over Adams catalyst by the method described in Example 7. 21 parts of ethyl 4-amino-2-carbethoxy - 2 - (p-chlorophenyl)-butyrate hydrochloride are obtained which melts at 155–156°.

*Example 14*

19 parts of ethyl 4-amino-2-carbethoxy-2-(p-chlorophenyl)-malonate (as prepared in Example 13) are refluxed for 16 hours with 50 parts by volume of 6 N hydrochloric acid. The reaction mixture is concentrated in vacuo, leaving a crystalline residue of 4-amino-2-(p-chlorophenyl)-butyric acid hydrochloride. It melts at 198–199° after recrystallization from a mixture of isopropyl alcohol and ether. Yield: 11 parts.

*Example 15*

8 parts of 4-amino-2-(p-chlorophenyl)-butyric acid hydrochloride are esterified by the method described in Example 4. Ethyl 4-amino-2-(p-chlorophenyl)-butyrate hydrochloride separates from the reaction mixture after 4 days and is removed by filtration. It melts after recrystallization from ethanol at 159–160°. Yield: 8 parts.

*Example 16*

Carbethoxylation of ethyl 3,4-methylenedioxyphenylacetate by the process described in Example 7 yields diethyl 3,4-methylenedioxyphenylmalonate, B.P. 174–175°/6 mm.

Treatment of diethyl 3,4 - methylenedioxyphenylmalonate with chloroacetonitrile according to the directions in Example 7 yields diethyl 2-cyanomethyl-2-(3,4-methylenedioxyphenyl)malonate, B.P. 157–160/0.1 mm.

31 parts of diethyl 2-cyanomethyl-2-(3,4-methylenedioxyphenyl)malonate are hydrogenated over Adams catalyst in the presence of an equivalent of hydrochloric acid using the process described in Example 9. The crude syrup which is obtained on work up of the reaction is dissolved in an ether-benzene mixture. Ethyl 4-amino-2-carbethoxy - 2 - (3,4-methylenedioxyphenyl) butyrate hydrochloride, crystallizes from the mixture and is removed by filtration. After a second crystallization it melts at 91–92°. Yield: 14 parts.

*Example 17*

6 parts of ethyl 4-amino-2-carbethoxy-(3,4-methylenedioxyphenyl) butyrate hydrochloride is hydrolyzed by refluxing for 4½ hours with 25 parts by volume of 3 N hydrochloric acid. The reaction mixture is concentrated in vacuo to a syrupy residue which is caused to crystallize by trituration with ether at 0°. Recrystallization of the crude product so prepared yields 2.2 parts of 4-amino-2-(3,4-methylenedioxyphenyl) butyric acid. M.P. 210–211°.

*Example 18*

1.8 parts of 4-amino-2-(3,4-methylenedioxyphenyl) butyric acid hydrochloride is converted to ethyl 4-amino-2-(3,4-methylenedioxyphenyl)-butyrate hydrochloride by the esterification procedure described in Example 4. The crude syrupy ester crystallizes on trituration with ether (M.P. 104–105°) and is recrystallized from an alcohol-ether mixture; yield, 1.5 parts; M.P. 104–105°.

It will be understood that in those of the preceding examples where the hydrochloride is directly prepared, the free base may be recovered by neutralizing the salt with one equivalent e.g. of an alkaline hydroxide, such as sodium hydroxide or calcium hydroxide or the like. By employing a second equivalent of alkaline hydroxide the corresponding salt (—COOR$_1$)—e.g., the sodium, calcium or the like salt—is obtained.

What is claimed is:

1. The compound of the formula

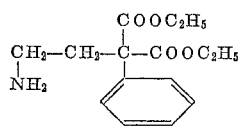

2. The compound of the formula

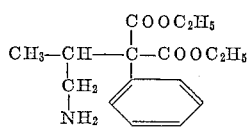

3. The compound of the formula

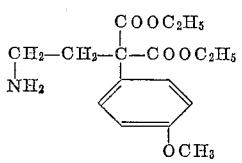

4. The compound of the formula

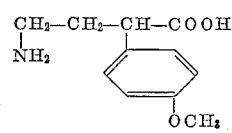

5. The compound of the formula

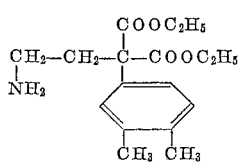

6. The compound of the formula

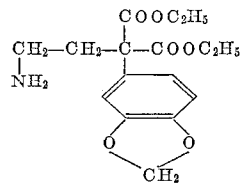

7. The compound of the formula

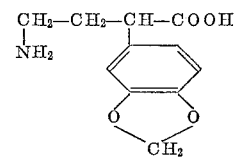

8. A member selected from the group consisting of the compounds of the formula

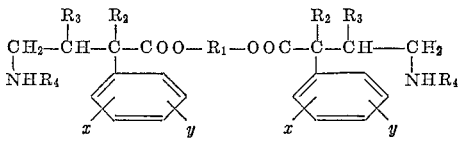

and the non-toxic salts thereof, wherein
$R_1$ is an alkaline earth metal ion,
$R_2$ is a member selected from the group consisting of hydrogen and carbethoxy,
$R_3$ and $R_4$ each is a member selected from the group consisting of hydrogen and methyl,
$x$ is a member selected from the group consisting of methyl, methoxy, chlorine and hydrogen,
$y$ is a member selected from the group consisting of methyl and hydrogen, and
$x$ and $y$ taken together stand for —O—CH$_2$—O— attached to adjacent carbon atoms of the phenyl group.

9. A member selected from the group consisting of the compounds of the formula

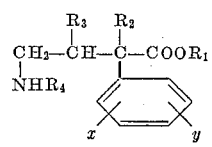

and the non-toxic salts thereof, wherein
$R_1$ is an alkali metal ion,
$R_2$ is a member selected from the group consisting of hydrogen and carbethoxy,
$R_3$ and $R_4$ each is a member selected from the group consisting of hydrogen and methyl,
$x$ is a member selected from the group consisting of methyl, methoxy, chlorine and hydrogen,
$y$ is a member selected from the group consisting of methyl and hydrogen, and
$x$ and $y$ taken together stand for —O—CH$_2$—O— attached to adjacent carbon atoms of the phenyl group.

10. The compound of the formula

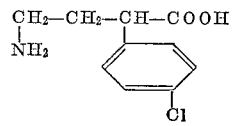

References Cited in the file of this patent

UNITED STATES PATENTS

| | | |
|---|---|---|
| 2,555,353 | Lucas et al. | June 5, 1951 |
| 2,846,446 | Knowles | Aug. 5, 1958 |
| 2,846,447 | Weesner | Aug. 5, 1958 |
| 2,852,526 | Villani et al. | Sept. 16, 1958 |
| 2,890,985 | Marsh et al. | June 16, 1959 |
| 2,902,404 | Spencer | Sept. 1, 1959 |
| 2,956,058 | Shepard et al. | Oct. 11, 1960 |